United States Patent
Kolletre

(10) Patent No.: US 12,054,088 B2
(45) Date of Patent: Aug. 6, 2024

(54) BI-DIRECTIONAL TIGHTENING DEVICE FOR TIGHTENING OF A THREADABLE LINE, AND A METHOD FOR OPERATING THE BI-DIRECTIONAL TIGHTENING DEVICE

(71) Applicant: Cojack AS, Haugesund (NO)

(72) Inventor: Odd Arild Kolletre, Åkrehamn (NO)

(73) Assignee: Cojack AS, Haugesund (NO)

( * ) Notice: Subject to any disclaimer, the term of this patent is extended or adjusted under 35 U.S.C. 154(b) by 79 days.

(21) Appl. No.: 17/796,150

(22) PCT Filed: Jan. 6, 2021

(86) PCT No.: PCT/NO2021/050001
§ 371 (c)(1),
(2) Date: Jul. 28, 2022

(87) PCT Pub. No.: WO2021/154084
PCT Pub. Date: Aug. 5, 2021

(65) Prior Publication Data
US 2023/0103711 A1 Apr. 6, 2023

(30) Foreign Application Priority Data
Jan. 31, 2020 (NO) .................................. 20200121

(51) Int. Cl.
*B60P 7/08* (2006.01)
*B65B 13/22* (2006.01)
*F16G 11/12* (2006.01)

(52) U.S. Cl.
CPC .............. *B60P 7/083* (2013.01); *B65B 13/22* (2013.01); *F16G 11/12* (2013.01)

(58) Field of Classification Search
CPC .. B60P 7/083; B60P 7/06; B65B 13/22; F16G 11/12; B25B 25/00; Y10T 24/21
See application file for complete search history.

(56) References Cited

U.S. PATENT DOCUMENTS

| 1,401,739 | A | 12/1921 | Hyram |
| 6,195,848 | B1 | 3/2001 | Jackson et al. |

(Continued)

FOREIGN PATENT DOCUMENTS

| DE | 10 2012 110 036 | 4/2014 |
| DE | 10 2012 110036 B4 | 12/2014 |

OTHER PUBLICATIONS

Norwegian Search Report for NO 20200121, dated May 28, 2020.
(Continued)

*Primary Examiner* — Robert Sandy
*Assistant Examiner* — Louis A Mercado
(74) *Attorney, Agent, or Firm* — Andrus Intellectual Property Law, LLP

(57) ABSTRACT

A bi-directional tightening device and a method for tightening of a threadable line, the tightening device having: a rotatable spool; a frame for supporting the spool, the frame has a handle for rotating the spool; a ratchet mechanism rotationally fixed to the spool; a drive pawl coupled to the frame; a locking mechanism configured for keeping the ratchet mechanism in place during a return stroke of the handle, wherein the ratchet mechanism has at least one first ratchet wheel for rotating the spool in a first direction, and at least one second ratchet wheel for rotating the spool in a second direction opposite the first direction, to allow bi-directional tightening of the line.

12 Claims, 7 Drawing Sheets

(56) References Cited

U.S. PATENT DOCUMENTS

| | | |
|---|---|---|
| 7,412,754 B2 | 8/2008 | Hanson |
| 7,752,717 B2 * | 7/2010 | Hanson .................. B60P 7/083 24/68 CD |
| 7,950,629 B2 | 5/2011 | Mamie |
| 8,499,662 B2 | 8/2013 | Chang |
| 2005/0125959 A1 | 6/2005 | Hanson |

OTHER PUBLICATIONS

International Search Report and the Written Opinion for PCT/NO2021/050001, dated Mar. 26, 2021.
European Patent Application No. 21747150, European Search Report dated Jan. 19, 2024, 2 pages.

* cited by examiner

BI-DIRECTIONAL TIGHTENING DEVICE FOR TIGHTENING OF A THREADABLE LINE, AND A METHOD FOR OPERATING THE BI-DIRECTIONAL TIGHTENING DEVICE

CROSS-REFERENCE TO RELATED APPLICATIONS

This application is the U.S. national stage application of International Application PCT/NO2021/050001, filed Jan. 6, 2021, which international application was published on Aug. 5, 2021, as International Publication WO 2021/154084 in the English language. The International Application claims priority of Norwegian Patent Application No. 20200121, filed Jan. 31, 2020. The international application and Norwegian application are both incorporated herein by reference, in entirety.

FIELD

The present disclosure is related to a cargo securing device for securing a cargo on a means of transport. More particularly, the disclosure is related to a bi-directional tightening device for tightening of a threadable line, and a method for operating the bi-directional tightening device. The tightening device comprises a rotatable spool provided with an aperture for receiving the line, and a ratchet mechanism rotationally fixed to the spool. The spool is supported by a frame comprising a handle for rotating the spool by means of a drive pawl coupled to the frame and configured to engage the ratchet mechanism when the handle is stroked to rotate the spool. The tightening further comprises a locking mechanism configured for keeping the ratchet wheel in place during a return stroke of the handle.

BACKGROUND

A cargo tightening device for tightening lines, particularly belts or webs, comprising a ratcheting mechanism to wind the tightening lines are well known for securing a load on a means for transport on land, sea or in the air. Examples of such prior tightening devices are disclosed in the publications U.S. Pat. No. 7,950,629 B2, U.S. Pat. No. 6,195,848 B1, U.S. Pat. No. 8,499,662 B2, and U.S. Pat. No. 1,401,739 A.

The prior art devices, however, suffer from the same drawback, namely that the direction of a power stroke for rotating the spool is fixed for each particular device. In this document, the power stroke refers to the direction in which the handle is moved in order to engage the drive pawl with the ratchet mechanism. The power stroke may be either a "pull" stroke or a "push" stroke. A pull stroke may be advantageous when an operator can use his or her body weight to assist in moving the handle. However, in some situations, typically when the tightening device is at a low level with respect to the operator, it may be more convenient for the operator to provide a "push" stroke for moving the handle.

Publication DE 102012110036 A1 discloses a pawl lever block provided with attachment element suspended and connected to a wire rope to displace a gear rack such that the gear rack is displaced by driving ratchet wheel so as to allow goods to be bundled and stably packed by proper wire rope tension. The lever block is provided with a ratchet wheel formed with an annularly arranged ratchet teeth on a rotary axis. The gear rack is arranged on a support and engaged with the ratchet teeth of the ratchet wheel. An attachment element is arranged on the gear rack such that another attachment element is fixed at a certain point. The former attachment element is suspended and connected to the wire rope to displace the gear rack such that the gear rack is displaced by driving the ratchet wheel.

Publication U.S. Pat. No. 7,412,754 B2 discloses a bi-directional tightening device for tightening of a threadable line and an anchoring line. The device is configured for allowing an operator to select the power stroke to be a "pull" stroke or a "push" stroke simply by inverting a connection position of the threadable line and the anchoring line with respect to the tightening device. Thus, the operator must select a "pull" stroke configuration or a "push" stroke configuration prior to connecting the threadable line and anchoring line to the device.

SUMMARY

The invention has for its object to remedy or to reduce at least one of the drawbacks of the prior art, or at least provide a useful alternative to prior art.

The object is achieved through features specified in the description below and in the claims that follow.

The inventor has surprisingly found that it is possible to make a tightening device that allows an operator to select between a "push" stroke or a "pull" stroke even after the threadable line and an anchoring line have been connected to the apparatus.

The invention is defined by the independent patent claims. The dependent claims define advantageous embodiments of the invention.

In a first aspect of the invention there is provided a bi-directional tightening device for tightening of a threadable line, the tightening device comprising:
- a rotatable spool provided with an aperture for receiving the line;
- a frame for supporting the spool, the frame comprising a handle for rotating the spool;
- a ratchet mechanism rotationally fixed to the spool;
- a drive pawl coupled to the frame and configured to engage the ratchet mechanism when the handle is stroked to rotate the spool;
- a locking mechanism configured for keeping the ratchet mechanism in place during a return stroke of the handle.

The ratchet mechanism comprises at least one first ratchet wheel for rotating the spool in a first direction and at least one second ratchet wheel for rotating the spool in a second direction opposite the first direction, the drive pawl and the locking mechanism being sideways and radially displaceable, and provided with protrusions configured for selectively engaging either one of the ratchet wheels, to allow bi-directional tightening of the line.

By selecting which one of the first ratchet wheel and the second ratchet wheel to be engaged by the drive pawl and the locking mechanism, an operator can select whether tightening of the threadable line shall be performed by applying a "push" stroke or a "pull" stroke, even after the threadable line has been inserted through the aperture of the rotatable spool.

When in operation, an additional anchoring line is connected to a portion of the tightening device in a way known per se. End portions of both the threaded line and the anchoring line facing away from the tightening device are typically provided with attachment means, for example a hook, for engaging a portion of a substructure. In an active position wherein the tightening device ties an object to a substructure, the threaded line and the anchoring line may be subject to considerable tension and portions of at least one of the lines may abut tightly against the object.

Another effect of selecting either the first ratchet wheel or the second ratchet wheel to be engaged by the drive pawl and the locking mechanism, is that a tension in the threaded line and the anchoring line may be reduced in a controlled manner simply by repositioning the engagement of the drive pawl and the locking mechanism from one of the first ratchet wheel or the second ratchet wheel, to the other one of the second ratchet wheel and the first ratchet wheel, respectively. Contrary to prior art tightening devices, a minor slack in the lines may thus be provided without fully releasing the tension in the lines and possibly losing engagement between for example the hooks of the lines and the substructure.

In one embodiment the at least one first ratchet wheel comprises a set of two ratchet wheels, and the at least one second ratchet wheel comprises a set of two ratchet wheels. Providing two ratchet wheels of each type is advantageous with respect to transferring torque from the drive pawl to the spool via the ratchet wheels.

In one embodiment, the first ratchet wheels and the second ratchet wheels are arranged alternating along a longitudinal axis of the spool.

The drive pawl and the locking mechanism may be configured for being operated independently of each other, i.e. individual operation. Individual operation of the drive pawl and the locking mechanism makes possible arranging the drive pawl in engagement with one of the at least one first ratchet wheel for rotating the spool in a first direction and at least one second ratchet wheel for rotating the spool in a second direction opposite the first direction, while the locking mechanism may be arranged into engagement with the other one of the at least one second ratchet wheel or the at least one first ratchet wheel that are not engaged with the drive pawl. This has the effect that the spool is prevented from rotation. A secure locking of the tightening device may thus be achieved independently of a position of the part of the frame comprising the handle.

In a second aspect of the invention there is provided a method of operating of a bidirectional tightening device according to the first aspect of the invention, the method comprises the steps of:
bringing the drive pawl into engagement with one of: the ratchet wheel for rotating the spool in the first direction; and the ratchet wheel for rotating the spool in the second direction; and
bringing the locking mechanism into engagement with one of: the ratchet wheel for rotating the spool in the first direction; and the ratchet wheel for rotating the spool in the second direction.

The method may comprise arranging the locking mechanism into engagement with the same ratchet wheel as the drive pawl to provide a tightening device operable in a push or a pull mode.

The method may comprise arranging the locking mechanism into engagement with the opposite ratchet wheel as the drive pawl to provide a locking of the tightening device.

The drive pawl and the locking mechanism may be operated independently of whether the spool carries a line. The method may thus comprise operating the drive pawl and the locking mechanism after a line has been threaded onto the spool. Thus, an operator can select which one of the first rotation direction and the second rotation direction to be activated even after the line has been inserted through the spool.

The method may comprise slackening of a threaded line in a controlled manner by releasing the drive pawl and the locking mechanism from engagement with one of the first and second ratchet wheel to the other one of the second and first ratchet wheel; and slackening of the line by means of operating the handle of the frame.

BRIEF DESCRIPTION OF THE DRAWINGS

In the following is described an example of a preferred embodiment illustrated in the accompanying drawings, wherein.

DETAILED DESCRIPTION OF THE DRAWINGS

Figure 1:
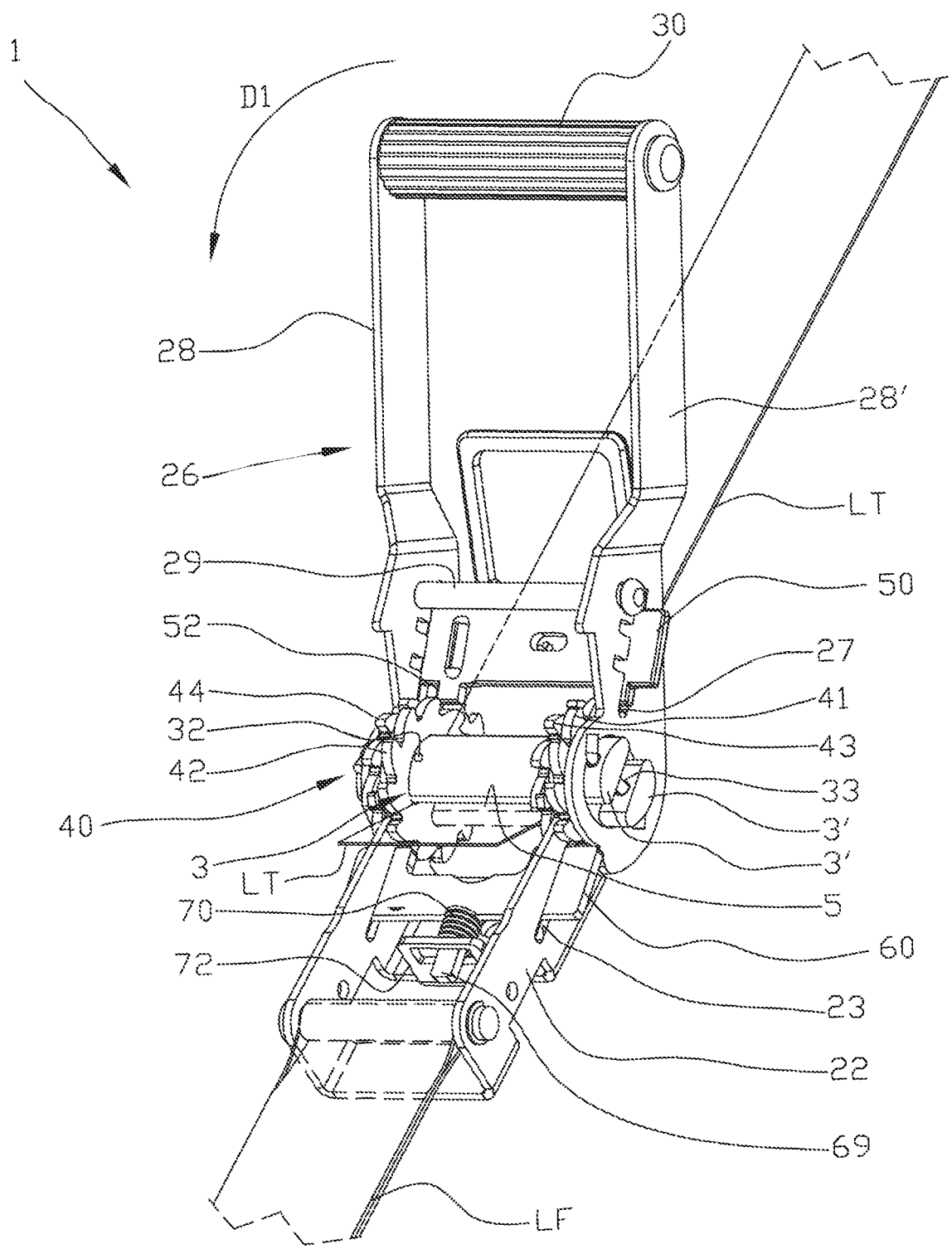
FIG. 1 shows a perspective view of a tightening device according to the invention in a first operation mode/configuration.

In the figures, positional indications such as for example left, right, and sideways, refer to the position shown in the figures.

Same or corresponding elements are indicated by same reference numerals. For clarity reasons some elements may in some of the figures be without reference numerals.

In the figures, reference numeral 1 denotes a tightening device according to the present invention. The tightening device 1 disclosed herein is a modification of a prior art tightening device and the skilled person will understand a basic principle of how a ratchet mechanism operates. The discussion hereinafter therefore mainly focuses on the inventive features of the tightening device.

The tightening device 1 comprises a rotatable spool 3 provided with an aperture 5 for receiving a line (line LT). In the embodiment shown, such a line will typically be a strap. The spool 3 is constituted by two semi-circular rods 3' arranged in parallel and spaced apart to provide the rotatable spool 3.

Figure 7:
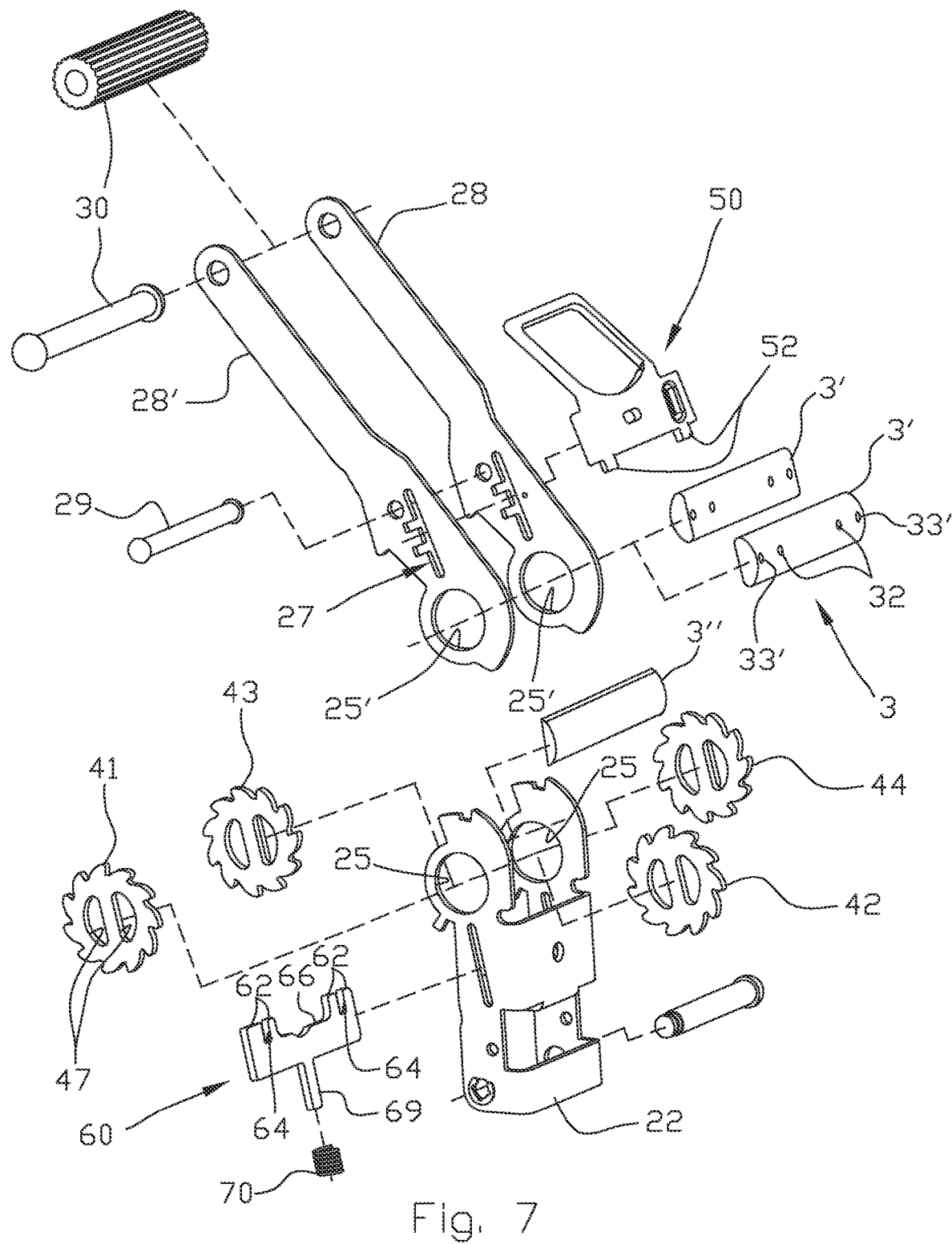
FIG. 7 shows an exploded view of the tightening device in FIG. 3.

The spool 3 is supported in a frame comprising two frame parts: a base frame 22; and a drive frame 26. The drive frame 26 is formed by two parallel arms 28, 28' interconnected by a spacer bolt 29 and a handle 30 comprising a bolt. The base frame 22 and the drive frame 26 are interconnected by means of the spool 3 threaded through complementary and overlapping apertures 25 and 25' arranged in the base frame 22 and each one of the arms 28, 28', respectively. The apertures 25, 25' are best seen in FIG. 7. An additional anchoring line LF is connected to a portion of the base frame 22.

In the embodiment shown, the spool 3 is locked to the frame by means of pins 33 extending through apertures 33' at each end portion of the semi-circular rod 3'.

A ratchet mechanism 40, here in the form of four ratchet wheels 41, 42, 43, 44, is rotationally fixed to the spool 3. Each one of the ratchet wheels are provided with two semicircular apertures 47 as best seen in FIG. 7 configured for mating with the semi-circular rod 3' of the spool 3. The ratchet wheels 41, 42, 43, 44 are threaded onto the semi-circular rods 3' and is therefore rotationally fixed to the spool 3. The ratchet wheels 42, 43 are prevented from moving towards each other by means of for example a clamping sleeve (not shown) inserted through mating holes 32 in the semi-circular rods 3'.

In the embodiment shown with four ratchet wheels 41, 42, 43, 44, a first pair of ratchet wheels is formed by the wheels 41, 42 and a second pair of ratchet wheels is formed by the wheels 43, 44.

The first pair of ratchet wheels 41, 42 has teeth and dents slanting in a first direction, while the second pair of ratchet wheels 43, 44 has teeth and dents slanting in a second direction opposite the first direction of the first pair of teeth.

A drive pawl 50 is slidably coupled to a slot 27 in each arm 28, 28' of the drive member 26. The drive pawl 50 is configured for cooperating with the ratchet mechanism 40.

The drive pawl 50 comprises two protrusions 52 configured for engaging either the first set of ratchet wheels 41, 42, or the second set of ratchet wheels 43, 44. An operator selects which one of the sets of ratchet wheels to be engaged by the protrusions 52 by sliding the drive pawl 50 sideways between the two arms 28, 28' of the drive member 26.

To facilitate sideways sliding of the drive pawl 50 to select which one of the sets of ratchet wheels to be engaged by the protrusions 52, a length of the slot 27 is longer than the portion of the drive pawl 50 extending through the slot 27. Thus, the drive pawl 50 is configured for sliding both sideways between the two arms 28, 28' of the drive member 26, and radially with respect to the ratchet mechanism 40 and thus the spool 3.

The tightening device 1 is further provided with a locking mechanism 60 configured for keeping the ratchet mechanism 40 in place during a return stroke of the handle 30. The locking mechanism 60 is coupled to slots 23 in the base frame 22 and is arranged sideways slidable within the slots 23.

The part of the locking mechanism 60 facing the ratchet mechanism 40 is provided with locking protrusions 62 configured for engaging either the first pair of ratchet wheels 41, 42, or the second pair of ratchet wheels 43, 44. Juxtaposed to either side of the locking protrusions 62 there is provided indents 64, 66. The purpose of the indents 64, 66 is to accommodate the set of ratchet wheel that are not being engaged by the protrusions 52 of the drive pawl 50.

The part of the locking mechanism 60 facing away from the ratchet mechanism 40 is provided with a resilient member, here in the form of a spring 70, to urge the locking protrusions 62 into engagement with either the first pair of ratchet wheels 41, 42 or the second pair of ratchet wheels 43, 44, as selected by an operator. The spring 70 is carried by a pin 69 protruding from the locking mechanism 60, and the spring 70 abuts against a retaining element 72 protruding from a portion of the base frame 22. To allow sideways sliding of the locking mechanism 60, the retaining element 70 is provided with a slot for accommodating an end portion of the pin 69.

To allow inter alia a radial movement of the locking mechanism 60 when the protrusions 62 slide over a top of the teeth, a length of each slot 23 is longer than the portion of the locking mechanism 60 extending through the slots 23. Thus, the locking mechanism 60 is configured for sliding both sideways within the base frame 22, and radially with respect to the ratchet mechanism 40 and thus the spool 3. In the embodiment shown, this radial movement of the locking mechanism 60 is also provided by an operator when releasing a tension in a line tightened by the device 1.

Figure 2:
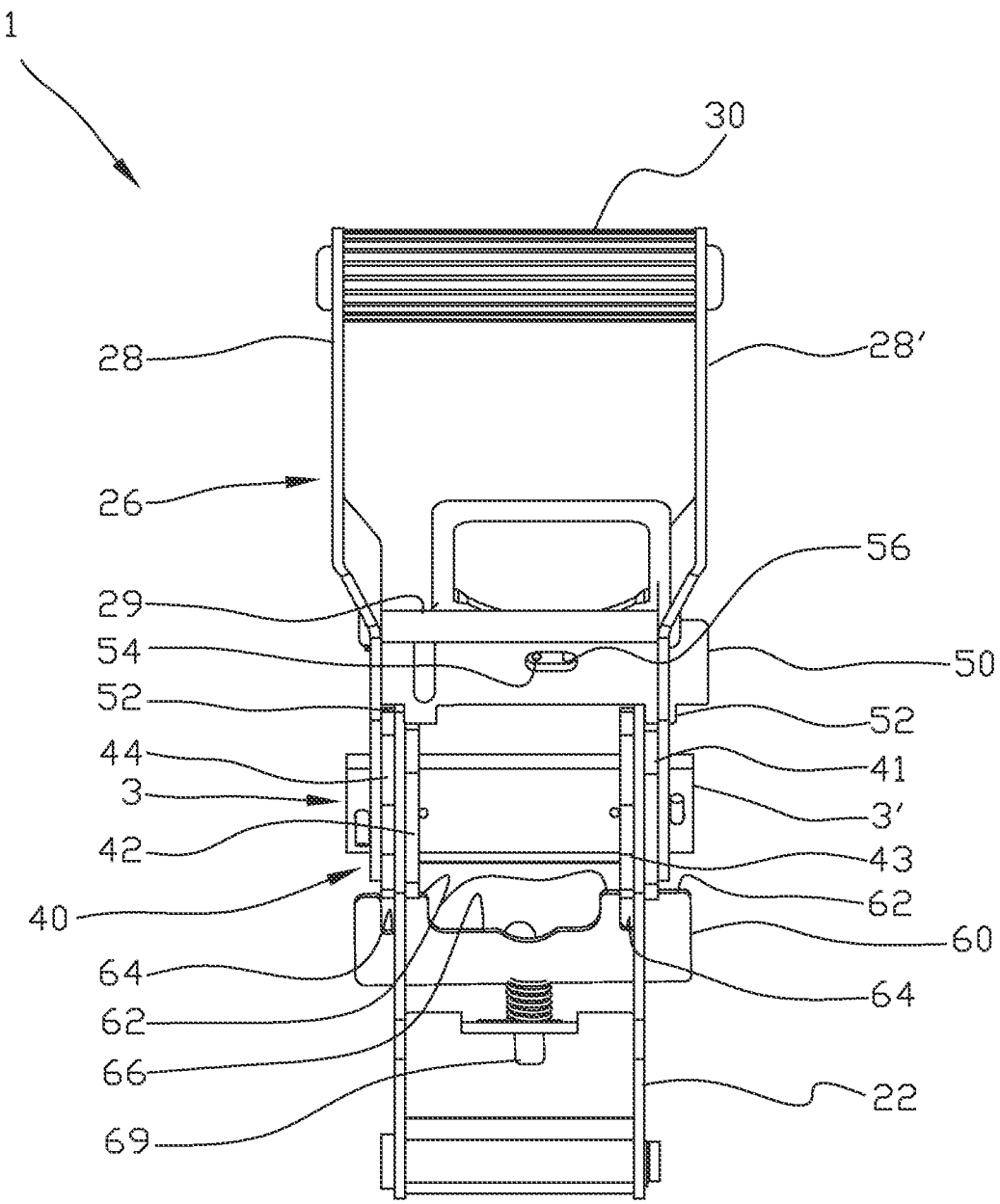
FIG. 2 shows another view of the tightening device in FIG. 1.
Figure 3:
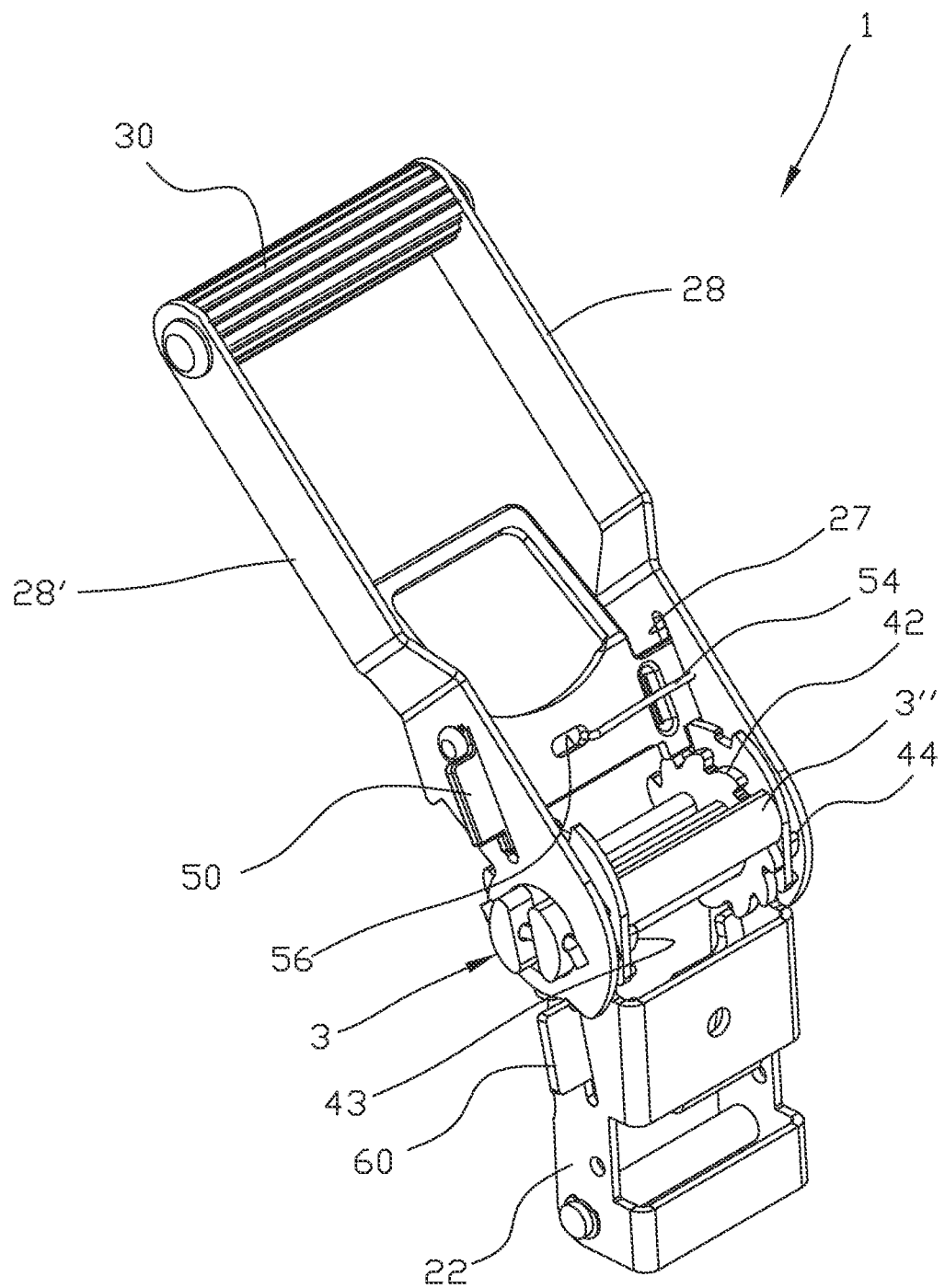
FIG. 3 shows the tightening device in FIG. 1 seen from behind.

Turning now to FIGS. 1 to 3 showing the tightening device 1 in a first or "push" configuration. The drive pawl 50 has been slid to the right in FIGS. 1 and 2 (and thus to the left in FIG. 3 wherein the device 1 is seen from behind). In this position, the protrusions 52 of the drive pawl 50 engage the first set of ratchet wheels 41, 42. Thus, when the drive frame 26 is urged in the direction of the arrow D1 shown in FIG. 1, the ratchet mechanism 40 and thus the spool 3 is rotated counterclockwise with respect to the view in FIG. 1. During a return stroke (in an opposite direction of the arrow D1), the drive pawl 50 moves radially back and forth with respect to the ratchet mechanism 40 as the protrusions 52 pass over the teeth of the ratchet wheels 41, 42. The drive pawl 50 is urged radially towards the ratchet mechanism 50 by means of a biasing means, here in the form of a pin member 54 protruding from the arm 28 and engages an aperture 56 in the drive pawl 50.

As best seen in FIG. 2, a periphery of the second pair of ratchet wheels 43, 44 is "accommodated" in the indents 64 of the locking mechanism 60 so that ratchet wheels 43, 44 are not engaged by the locking mechanism 60. Thus, in this "push" configuration, the second pair of ratchet wheels 43, 44 are neither engaged by the protrusions 52 of the drive pawl 50, nor the locking device 60. The second pair of ratchet wheels is in a passive mode.

In FIG. 3 is also shown a strutting member 3" secured to the base frame 22 for example by means of a weld. A purpose of the strutting member 3" is to stabilize the portion of the base frame 22 surrounding the apertures 25. The apertures 25 are best seen in FIG. 7.

To prevent the ratchet mechanism 40 and thus the spool 3 from rotating during a return stroke, i.e. a stroke in the opposite direction of the arrow D1 in FIG. 1, the locking mechanism 60 has also been slid to the right in FIGS. 1 and 2 (and thus to the left in FIG. 3 wherein the device 1 is seen from behind). In this position, the protrusions 62 of the locking mechanism 60 engages the first set of ratchet wheels 41, 42 and prevents the ratchet mechanism 40 and thus the spool 3 from rotating.

Figure 4:
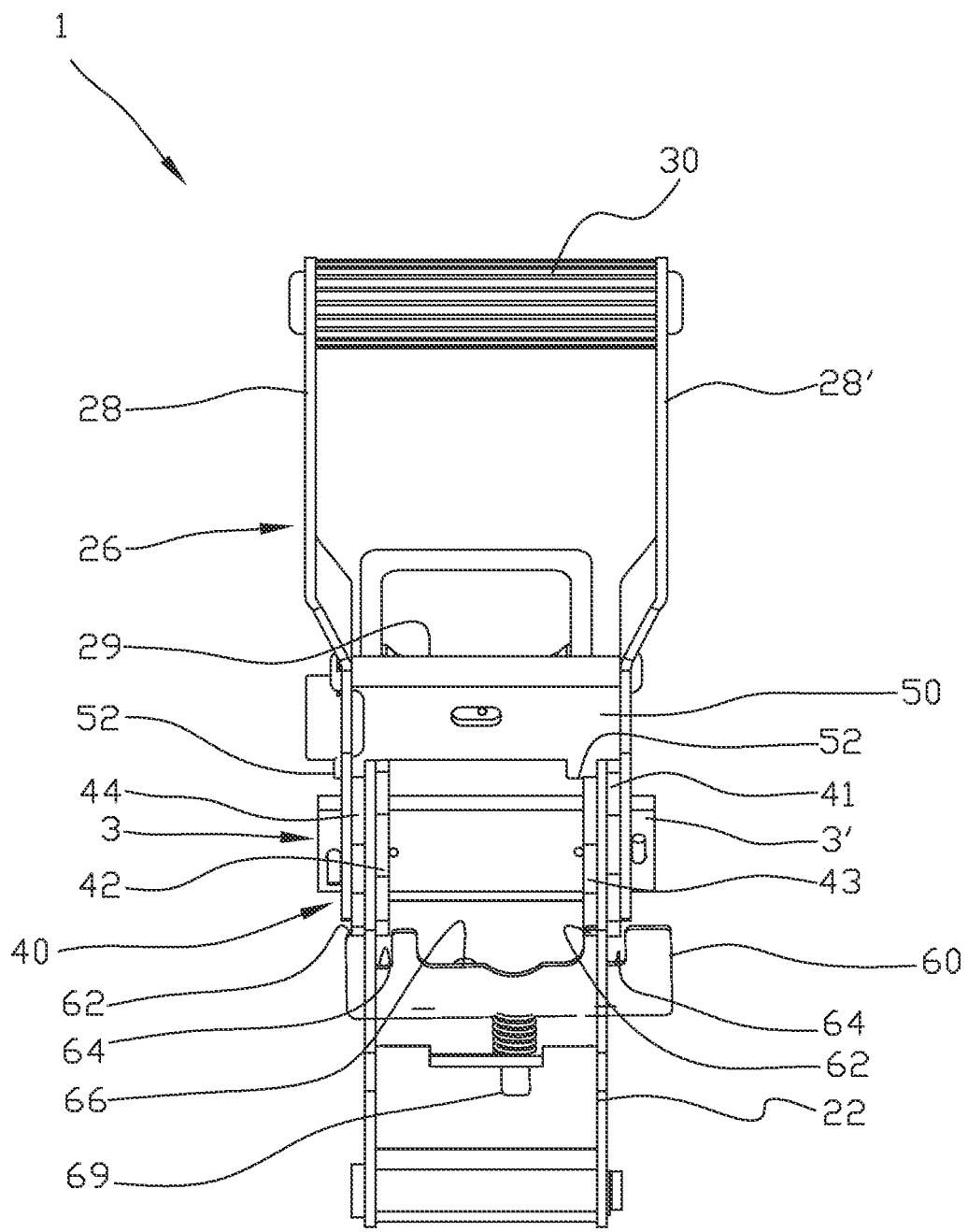
FIG. 4 shows the tightening device in FIG. 2 in a second operation mode/configuration.

In FIG. 4, the tightening device 1 is in a second or "pull" configuration. The drive pawl 50 has been slid to the left. In this position, the protrusions 52 of the drive pawl engage the second set of ratchet wheels 43, 44. Thus, when the drive frame 26 is urged in the opposite direction of the arrow D1 shown in FIG. 1, the ratchet mechanism 40 and thus the spool 3 is rotated clockwise when spool 3 is seen from right to left. During a return stroke (which in FIG. 4 will be in the same direction as the arrow D1 in FIG. 1), the drive pawl 50 moves radially back and forth with respect to the ratchet mechanism as the protrusions 52 pass over the teeth of the ratchet wheels 41, 42.

To prevent the ratchet mechanism 40 and thus the spool 3 from rotating during a return stroke in the "pull" configuration shown in FIG. 4, the locking mechanism 60 has also been slid to the left. In this position, the protrusions 62 of the locking mechanism 60 engage the second set of ratchet wheels 43, 44 and prevent the ratchet mechanism 40 and thus the spool 3, from rotating.

Figure 5:
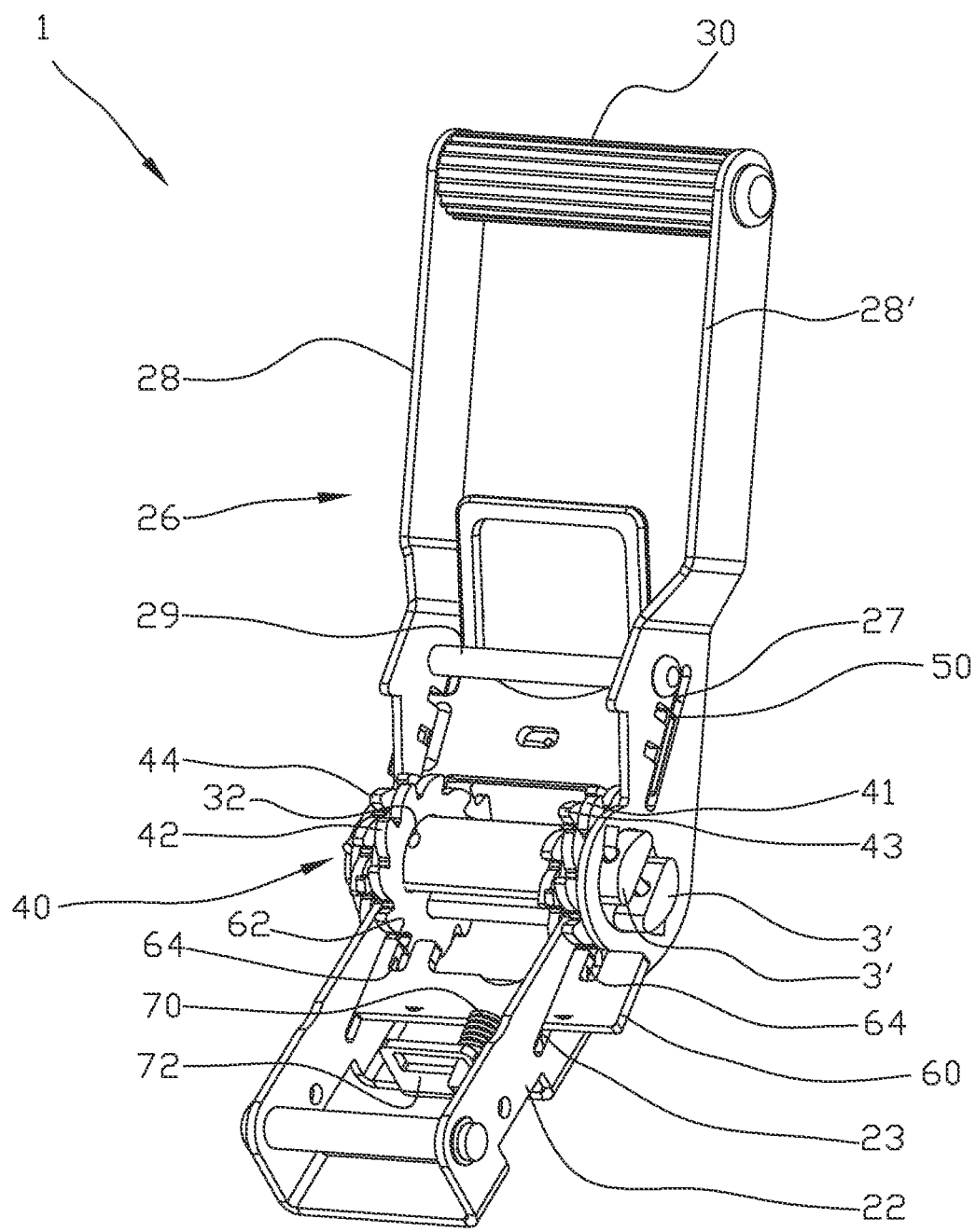
FIG. 5 shows another view of the tightening device in FIG. 2, in a locked operation mode.
Figure 6:
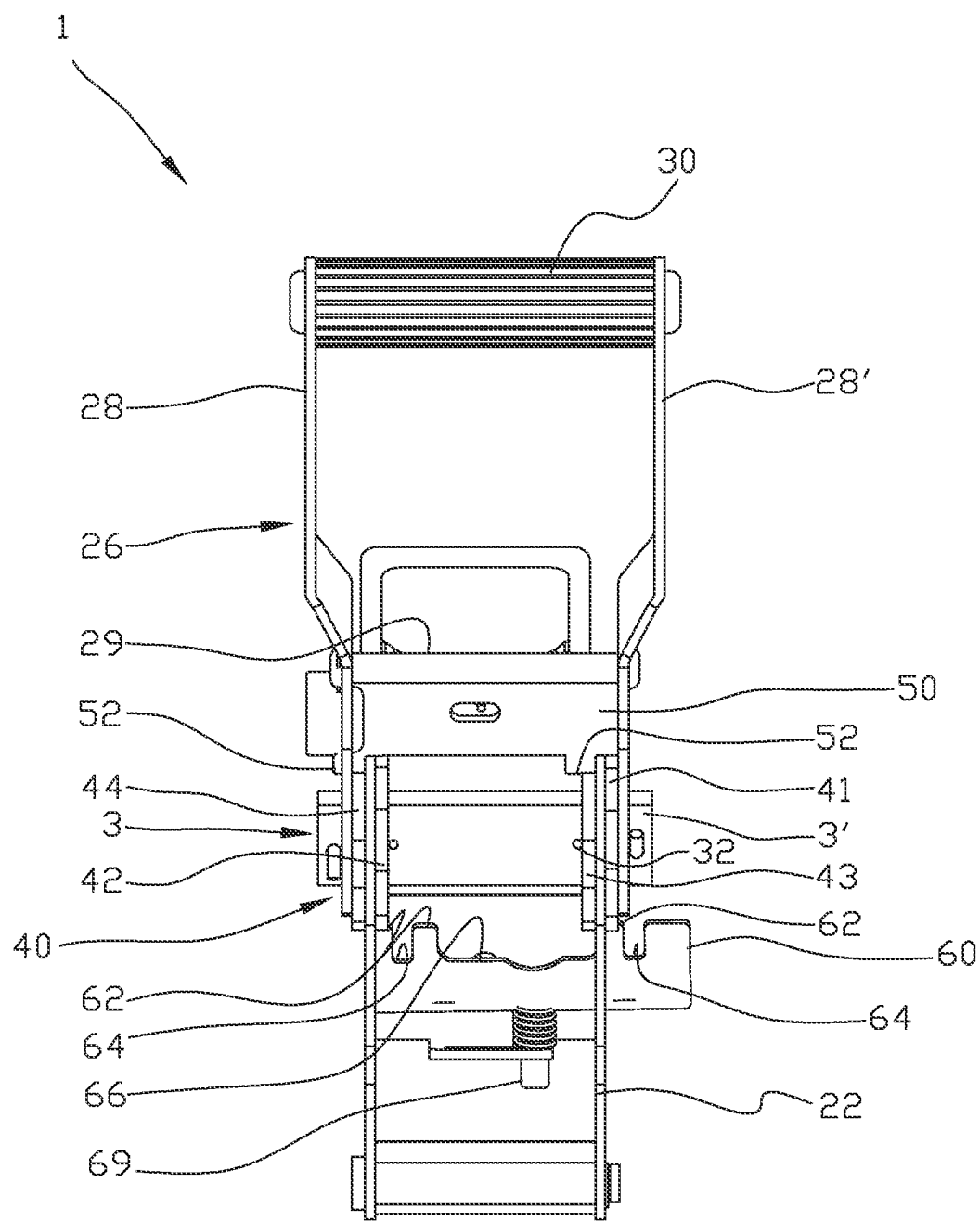
FIG. 6 shows the tightening device in FIG. 5 seen from behind.

In the embodiment shown in FIGS. 5 and 6, the tightening device is in a locked configuration. The protrusions 52 of the drive pawl 50 engage the second set of ratchet wheels 43, 44, while the locking mechanism 60 is oriented so that the protrusions 62 engage the first set of ratchet wheels 41, 42. The ratchet mechanism 40 and the spool 3 are therefore prevented from rotating, and the drive frame 26 is prevented from movement with respect to the rest of the tightening device 1. The configuration shown in FIGS. 4 and 6 may be important when there is a need for safe locking of the tightening device.

FIG. 7 is a principle exploded view of the tightening device shown in FIG. 3.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements.

The invention claimed is:

1. A bi-directional tightening device for tightening of a threadable line, the tightening device comprising:
    a rotatable spool provided with an aperture for receiving the line;
    a frame for supporting the spool, the frame comprising a handle for rotating the spool;
    a ratchet mechanism rotationally fixed to the spool;
    a drive pawl coupled to the frame and configured to engage the ratchet mechanism when the handle is stroked to rotate the spool;
    a locking mechanism configured for keeping the ratchet mechanism in place during a return stroke of the handle,
    wherein the ratchet mechanism comprises at least one first ratchet wheel for rotating the spool in a first direction, and at least one second ratchet wheel for rotating the spool in a second direction opposite the first direction, the drive pawl and the locking mechanism being sideways and radially displaceable, and provided with protrusions configured for selectively engaging either one of the ratchet wheels, to allow bi-directional tightening of the line.

2. The tightening device according to claim 1, wherein the at least one first ratchet wheel comprises a set of two first ratchet wheels, and the at least one second ratchet wheel comprises a set of two second ratchet wheels.

3. The tightening device according to claim 2, wherein the first ratchet wheels and the second ratchet wheels are arranged alternating along a longitudinal axis of the spool.

4. The tightening device according to claim 1, wherein the drive pawl and the locking mechanism are configured for being operated independently of each other.

5. A method of operating of the bi-directional tightening device according to claim 1, wherein the method comprises:
    bringing the drive pawl into engagement with one of: the first ratchet wheel for rotating the spool in the first direction; and the second ratchet wheel for rotating the spool in the second direction;
    bringing the locking mechanism into engagement with one of: the first ratchet wheel for rotating the spool in the first direction; and the second ratchet wheel for rotating the spool in the second direction.

6. The method according to claim 5, wherein the method comprises arranging the locking mechanism into engagement with the same ratchet wheel as the drive pawl to provide the tightening device operable in a push or a pull mode.

7. The method according to claim 6, wherein the drive pawl and the locking mechanism are operated after the line has been threaded onto the spool.

8. The method according to claim 5, wherein the method comprises arranging the locking mechanism into engagement with the opposite ratchet wheel as the drive pawl to provide a locking of the tightening device.

9. The method according to claim 8, wherein the drive pawl and the locking mechanism are operated after the line has been threaded onto the spool.

10. The method according to claim 5, wherein the drive pawl and the locking mechanism are operated after the line has been threaded onto the spool.

11. The method according to claim 5, wherein the method further comprising slackening of the line in a controlled manner by releasing the drive pawl and the locking mechanism from engagement with one of the first and second ratchet wheels to the other one of the second and first ratchet wheels; and slackening of the line by means of operating the handle of the frame.

12. The tightening device according to claim 1, wherein the at least one first ratchet wheel has teeth and dents slanted in a first tooth direction for rotating the spool in the first direction, and the at least one second ratchet wheel has teeth and dents slanted in a second tooth direction opposite the first tooth direction for rotating the spool in the second direction.

* * * * *